Patented Aug. 4, 1931

1,817,846

UNITED STATES PATENT OFFICE

WILLARD L. REINHARDT, OF EAST CLEVELAND, OHIO, ASSIGNOR TO WILLARD STORAGE BATTERY COMPANY, OF CLEVELAND, OHIO, A CORPORATION OF WEST VIRGINIA

STORAGE BATTERY

No Drawing.   Application filed June 18, 1928. Serial No. 286,495.

This invention relates to storage batteries of the lead-acid type and particularly to the negative pole plates which in accordance with my invention have a beneficial substance incorporated therein for the purposes to be explained.

The principal object of the invention is to impart to the plates increased capacity and improved life.

Briefly stated the invention comprises the incorporation to an amount sufficient to have certain beneficial effects, and the treatment by which there is incorporated, humic acid or a humic substance in the active material of the plate. This substance may be applied initially by mixing it with the oxide or oxides in forming the paste, or it may be incorporated or deposited in the pores of the paste before or after applied to the grids or in the pores of the active material of the formed or charged plates.

While I have found that humic acid thus incorporated in the active material of the plate accomplishes the desired results, I may obtain the humic acid by several processes, with some or possibly all of which there are associated with the humic acid small amounts of analogous materials such as ulmic acid, apocunic acid and crenic acid or part or all of said additional materials which may also have a beneficial effect; at least they do not adversely affect the action of the humic acid. Therefore, the material which is incorporated may be aptly termed "humic substance" i. e., consisting of humic acid or humic acid associated or mixed with one or more of the additional substances, namely, ulmic acid, apocunic acid and crenic acids. Not only may the humic acid or humic substance be obtained in various ways but its incorporation in the plate which is eventually formed may be accomplished in various ways and at various stages in the production of the formed plate as will be explained more in detail.

I may derive the humic substance from three or more general sources, to wit: from natural humins, from carbohydrates, and by the oxidation of phenols and their homologues.

Examples of the natural humins from which the humic substance may be derived are peat, muck, lignite or other forms of coal. The humic substance may be isolated from these products by digesting with an alkali which dissolves the humic substance from the natural material containing it.

Several alkalis may be used to dissolve the humic substance from natural humins, as for example sodium hydroxide or sodium carbonate solutions, and these solutions may vary in concentration as may be found necessary or desirable, but usually the lowest concentration which will dissolve the humic substance is used. I have found that a hot solution containing approximately one percent sodium hydroxide will dissolve out of most natural humins the major portion of the acids embraced in the term "humic substance", as defined above. On the other hand when a sodium carbonate solution is employed, the minimum concentration of sodium carbonate is approximately two and one-half percent. However, the concentration of these different solutions may be increased to as high as 20 or 30 percent, particularly if it is desired to dissolve out the humic substances in the cold. I have also found that humic substance can be dissolved from the natural humins by treating the latter with solutions of ammonia with an ammonia concentration of three percent or higher. After the humic substance has been dissolved from the natural humins as explained above the undissolved residue is filtered out and there is thus obtained an alkaline solution containing the humic acid or humic substance which is to be incorporated in the paste or in the active material of the plates. In dissolving the humic substance in the alkali, it is possible that the substance may combine with the alkali forming humates and compounds of like nature. However whether the substance is simply dissolved in the alkali or chemically combined so as to form humates and the like is immaterial.

From this point the process may be carried out in two different ways. The humic substance may be applied to the paste or active material when in liquid form (alkaline solution of the substance) and subsequently precipitated in the pores of the paste or active material, as will be explained, or it may first be precipitated from the solution and in the form of a powder thoroughly mixed with the oxide or oxides used in forming the paste. In the latter event it is first precipitated from the alkaline solution by the addition of a mineral acid such as sulphuric acid or hydrochloric acid, the former being preferred. Any suitable concentration of the acid may be used, the concentration depending entirely upon the amount of free alkali present in the solution. The precipitated humic acid or humic substance will then be filtered out and will be found to consist, when dry, of a very finely divided brown to black powder, which before being used may be washed free from the mineral acid used in precipitating the same from the alkaline solution.

The second source mentioned above from which the humic acid or humic substance may be derived is, carbohydrates. Examples of carbohydrates which may be employed for this purpose are starches, sugars, cellulose, lignin, and other materials which may contain lignocellulose or other complex celluloses. In obtaining from carbohydrates the humic acid or substance to be eventually incorporated in the battery plates, it is first necessary to get the carbohydrate into solution. For this purpose I prefer to employ a mineral acid, preferably sulphuric or water or both depending upon the material. Different concentrations of the acid may be employed depending upon the carbohydrate. For cellulose, a concentration of approximately 72 per cent has been found satisfactory, while sugars could be dissolved in water in some instances and then decomposed with the acid and in other instances in water and sulphuric acid of any desired concentration. Starches require some acid to get them into solution but the concentration necessary is considerably lower than 72 percent.

Next the diluted acid solution is boiled so as to precipitate out the humic acid or humic substance, the boiling being preferably continued until the specific gravity of the solution reaches approximately 1.2 at which point the major portion of the humic acid or humic substance is precipitated out. This boiling may be continued until the specific gravity is much higher if desired and thereby securing a higher yield of the humic substance. The solution may then be filtered out and the precipitate consisting of humic acid or humic substance may be washed free from the mineral acid. When dry, it is in the form of a brown powder finely divided.

The third source mentioned above of the humic acid or humic substance are phenols and their homologues, examples of which are phenol, hydroquinol, quinol, resorcin, creosol, catechol, fluorglucinal and many other compounds of this nature. The humic acid or humic substance may be obtained from these materials by oxidation in an alkaline solution, the oxidizing agent being atmospheric oxygen or other oxidizing agent such as sodium persulphate, potassium persulphate, hydrogen peroxide or the desired result may be obtained by anodic or electrolytic oxidation.

In obtaining humic acid or the humic substance from phenol or its homologues, it is only necessary to make the solution very slightly alkaline with a suitable alkali such as sodium hydroxide, sodium carbonate or ammonia. The original concentration of the alkali may be low, such as approximately 1 percent, particularly when sodium persulphate or potassium persulphate is used as the oxidizing agent, but when atmospheric oxygen is used for the oxidizing agent, it is desirable to have a slight increase in the alkaline concentration. When the slightly alkaline solution is subjected to atmospheric oxygen by passing air through it or when an oxidizing agent such as sodium persulphate or potassium persulphate is added to the solution, the humic acid or humic substance is formed and if desired it can be precipitated from the solution with a mineral acid which will produce a very finely divided humic acid or substance.

The humic acid and humic substance obtained from the above methods have been found to be slightly different in their composition. In some instances, the substance may consist of humic acid and in others it may consist of humic acid associated with one or more of the previously mentioned acids, such as ulmic, apocunic and crenic. However, it has been found that the substances obtained by any of the methods and derived from any of the above mentioned sources have the same beneficial effect in the negative plates of a storage battery.

The humic acid or humic substance obtained by any of the processes mentioned above and from the different sources described is used in the following manner, assuming first that it is in a dry powderous form:

To the regular oxide or oxides used in making the paste for the negative pole plates a small amount of the humic substance is added and is thoroughly mixed therewith by stirring so that the humic substance will be substantially uniformly distributed through the mass. The amount of the humic substance which is thus added will depend upon the use for which the battery is intended, the amount or percentage preferably varying from .1% to 1% by weight, depending upon the use for which the battery is intended.

After the mixing is completed the regular liquid is added to make the paste. The liquid may be either sulphuric acid, water, or a solution of ammonium sulphate. The liquid used in making this paste does not affect the humic substance or its operation in the plate.

The paste is then applied to a lead or lead antimony grid in the usual way and is converted electrolytically to metallic or sponge lead which forms the active material for the negative pole plate. This electrolytic treatment is of course the "forming" or charging step.

Another method of procedure to get the humic substance uniformly incorporated in the paste is to apply to the paste a solution of the humic substance and then precipitate the humic substance from the solution in the paste. An alkaline solution in which the humic substance has been dissolved may be employed. For this purpose I may dissolve the dry humic acid or humic substance in an alkaline solution such as sodium carbonate or ammonia or I may employ for this purpose the alkaline solution containing the dissolved humic substance obtained in the process described above for obtaining the humic substance from natural humins. In either event the alkaline solution of the humic substance is preferably diluted with water and then the dry oxide or oxides are mixed with this solution to form the paste. After paste of the proper consistency has been made with this solution, sulphuric acid is added and mixed with the paste and this precipitates the humic substance uniformly in all parts of the paste and in very finely divided form. The alkaline solution may contain more alkali than necessary to get the humic acid or humic substance into solution or just enough alkali to effect solution of the humic substance. But the concentration of the humic substance in the solution used in making the paste should be such that the paste will contain the proper amount of the humic substance when it has been precipitated by the sulphuric acid, this being as before stated preferably from .1% to 1% by weight depending upon the use for which the battery is intended.

Another method of carrying out my invention with the humic substance dissolved in an alkaline solution such as described above is to dip the fully formed negative plates made in the usual way into the solution and to allow them to remain in the solution until the pores of the plates are filled with the solution. Then by dipping the plates in sulphuric acid the humic substance will be precipitated uniformly in the pores of the plate.

I may treat pasted plates in this same manner. That is to say, the pasted or unformed plates with the paste produced in any of the usual ways may be dipped in the alkaline solution containing the dissolved humic substance and allowed to remain there until the pores are filled with the solution. Then by treating the pasted plates with sulphuric acid the humic substance is uniformly distributed in the paste. This last step of precipitating the humic substance may take place when the pasted plates are placed in a sulphuric acid bath for forming or charging purposes.

I may employ other solutions of the humic substance and get the humic substance precipitated in the pores of the paste or active material by other methods.

Still another method may be employed to get the humic substance into the plates of a battery after it has been built up. For example, the humic substance may be incorporated substantially uniformly through the positive as well as the negative plates of a battery by placing a dilute alkaline solution of the humic substance in the battery and electrolyzing the solution, then later draining the alkaline humic solution from the battery and filling with sulphuric acid and again electrolyzing. An unused or new battery may be treated in this manner and the humic substance thus deposited in the plates will have the advantageous effects mentioned below and expressed in the object of the invention set forth in the early part of the specification, or a used battery, whose active material has become more or less dead especially due to a lack of a proper expander when the paste was initially produced, may be treated in this manner with the added advantage that the capacity of negative plates is to an extent at least restored.

A battery having negative plates formed or treated by any of the processes described above has a desired amount of humic acid or humic substance in the negative plates and substantially uniformly distributed therethrough in a finely divided state and it should be noted that this substance or at least the major portion of it remains in the plates throughout their life as it is insoluble in the electrolyte of the battery.

With the humic substance obtained by any of the processes and applied to the paste or plates by any of the methods described above, plates of exceptionally high capacity are obtained. In fact the humic substance added to the negative plates increases the capacity of the same to such an extent that these plates can be made with less active material than the positive plates used in the same battery.

The greatest beneficial action of this humic substance in the negative plates is exhibited when the battery is discharged at temperatures lower than ordinary, as comparative tests made with batteries having negative plates with and without the humic substance show that those having the humic substance incorporated therein have much higher capacity than those without the substance. This same beneficial action is obtained whether the batteries are discharged at high or low temperature but it is more marked when the discharge takes place at the lower temperature. This is a very desirable feature inasmuch as the capacity of batteries is lower when discharged at low temperatures.

Another advantage of this humic substance incorporated and uniformly distributed in the plates is that it increases the life of the plates by preventing the particles of spongy lead from cohering together and becoming inactive. Tests have demonstrated the fact that a battery with negative plates treated or formed in accordance with this invention will last much longer, i. e., will give many more cycles before becoming inoperative than one having its negative plates not so treated.

Above I have described my invention as employed in the treatment of the negative pole plates inclusive, of course, of the treatment of the paste utilized in forming the plates, but while the greatest advantage is obtained by incorporating the humic substance in the paste utilized in forming the negative plates or in the negative plates themselves, I may wish to incorporate the humic substance in the paste used in forming the positive plates as well as the paste used in forming the negative plates or of incorporating the substance in both the positive and negative plates. However, I prefer to incorporate it in the negative plates only as I believe it has no particular advantage when incorporated in the positive plates.

Above I have stated that the percentage by weight of the humic substance incorporated in the negative plates may vary from about .1% to about 1%. I do not wish to be limited to this range for in some instances I may wish to increase or decrease the percentage of the humic substance with respect to the limits stated. Furthermore, by way of explanation of the statement that the percentage of humic substance will depend upon the use for which the battery is intended, I might say that for batteries which are employed practically all the time at substantially normal temperatures, a less percentage of the humic substance is required, and for batteries which at times are subjected to low temperature service conditions as for example batteries employed in starting and lighting systems of motor vehicles a higher percentage is usually employed.

The process disclosed above of introducing humic acid or humic material in finely divided form in the oxide or in the paste or in the plate by precipitation is claimed in a companion application Serial No. 291,139 filed July 7, 1928.

Having thus described my invention I claim:

1. A lead-acid type of storage battery plate having an expander composed chiefly of humic acid incorporated therein.

2. A negative plate for storage batteries of the lead-acid type having an expander composed chiefly of humic acid incorporated in the active material.

3. A lead-acid type of storage battery plate having an expander composed chiefly of humic substance substantially uniformly distributed in the active material.

4. A lead-acid type of storage battery plate having a small amount of an expander composed chiefly of humic substance distributed in the active material.

5. A lead-acid type of storage battery plate having an expander composed chiefly of finely divided humic substance in the active material and substantially uniformly distributed therein.

6. A lead-acid type of storage battery plate having incorporated in the active material to the amount of substantially one-tenth of one per cent to substantially one per cent by weight, of a substance containing humic acid.

7. A paste for the negative plates of storage batteries of the lead-acid type having distributed therethrough a small amount of an expander composed chiefly of humic acid.

8. A paste for storage batteries of the lead-acid type containing oxide of lead and a humic substance substantially uniformly distributed through the oxide in proportion from substantially one-tenth of one per cent to substantially one per cent by weight of the mass.

9. A mixture for use in making storage battery plates comprising oxide of lead having mixed therewith a humic substance to the amount of substantially one-tenth of one per cent to substantially one per cent by weight.

In testimony whereof, I hereunto affix my signature.

WILLARD L. REINHARDT.